United States Patent [19]

Bickley et al.

[11] 4,234,965
[45] Nov. 18, 1980

[54] COMMUNICATION TUNING SYSTEM UTILIZING LOCAL OSCILLATOR FREQUENCY SELECTION FOR MAXIMUM RF FILTER BANDWIDTH AND METHOD THEREOF

[75] Inventors: Robert H. Bickley; Ronald C. Briggs; Ronald C. Jost, all of Scottsdale, Ariz.

[73] Assignee: Motorola, Inc., Schaumburg, Ill.

[21] Appl. No.: 920,049

[22] Filed: Jun. 28, 1978

[51] Int. Cl.³ .................... H04B 1/04; H04B 1/06
[52] U.S. Cl. .................... 455/285; 455/120; 455/125; 455/191; 455/197
[58] Field of Search .......... 325/437, 438, 137, 138, 325/459, 462; 455/120, 125, 256, 257, 258, 285, 286, 188, 191, 197, 199

[56] References Cited

U.S. PATENT DOCUMENTS

| | | | |
|---|---|---|---|
| 2,201,938 | 5/1940 | Albright | 325/437 |
| 3,333,198 | 7/1967 | Mandell et al. | 325/308 |
| 3,414,821 | 12/1968 | Rickers et al. | 325/437 |
| 3,942,120 | 3/1976 | Ham | 325/437 |
| 3,942,122 | 3/1976 | Nakanishi | 325/459 |
| 4,025,855 | 5/1977 | Atkinson | 325/137 |
| 4,115,737 | 9/1978 | Hongu et al. | 325/437 |
| 4,132,952 | 1/1979 | Hongu et al. | 325/437 |

Primary Examiner—Douglas W. Olms
Attorney, Agent, or Firm—M. David Shapiro; Eugene A. Parsons

[57] ABSTRACT

The local oscillator frequency in a communication tuning system is selected to either high side mix or low side mix as appropriate to place the local oscillator frequency and image frequency outside the bandpass range of the bandpass filter. This allows bandpass filters having a frequency range equal to approximately twice the IF frequency in a transmitter, and approximately four times the IF frequency in a receiver.

6 Claims, 2 Drawing Figures

COMMUNICATION TUNING SYSTEM UTILIZING LOCAL OSCILLATOR FREQUENCY SELECTION FOR MAXIMUM RF FILTER BANDWIDTH AND METHOD THEREOF

BACKGROUND OF THE INVENTION

This invention relates to communications tuning systems, and more particularly, to heterodyne communication tuning systems.

The width of a radio frequency (RF) bandpass filter must be narrow enough to reject local oscillator (LO) frequencies when a heterodyne communication system is operating in a transmitting mode, and to reject image frequencies when the communication system is operating in a receiving mode. To generate the transmit signal, the local oscillator signal is coupled into the mixer along with the intermediate frequency (IF) signal and mixed to produce the desired RF frequency. However the mixer produces not only the desired RF signal, but also passes with some degree of attenuation, the local oscillator signal. Design specifications placed on transmitters require the local oscillator frequency signal be attenuated such that the desired RF signal is many dB, typically on the order of 40 dB, greater in signal strength than undesired frequencies, in this case the local oscillator frequency. In the past, the usual method of attenuating the local oscillator signal has been to pass the signal through a RF bandpass filter which is narrow enough to pass only the desired RF signal. Since the difference between the local oscillator frequency and the desired RF signal is the IF frequency, the bandpass characteristics of the bandpass filter are necessarily narrow with usually steep side slopes. This problem is compounded in a single conversion general coverage transmitter since the output frequency is one of a range of frequencies and the single conversion produces an output RF signal which is fairly close to the local oscillator frequency, for example on the order of 30 megahertz. A solution in the past has been to use a plurality of discrete bandpass filters which must be overlapping yet narrow enough to reject the LO frequency. Thus the filter bandwidth must be no greater than the difference between the desired RF signal and the local oscillator frequency which, as stated before, is equal to the frequency of the IF stage.

In a communications receiver, the signal which must be rejected by the RF bandpass filter is the image frequency. The image frequency is that signal having a frequency which is converted to the IF frequency during mixing with the local oscillator signal. Since the mixer produces both the sum and the difference between a local oscillator and the RF signal, both RF signals lying on either side, that is frequencies greater than the LO frequency and less than the LO frequency by a difference equal to the If, will be converted in the mixer to the IF and be amplified by the IF stage. Thus it is necessary for the RF bandpass filter to reject the undesired image frequency. The rejection of this image frequency is completely analogous to the rejection of the LO frequency of a transmitter. The same solutions have been used in the past and although the image frequency differs from the desired RF frequency by twice the IF frequency, the multiple relatively narrow bandpass filters are still a relatively expensive part of a communications receiver.

Therefore it can be appreciated that a communications system which effectively suppresses local oscillator frequencies during transmitting and image frequencies during receiving without requiring a large number of narrow-band bandpass filters is highly desirable.

SUMMARY OF THE INVENTION

It is therefore an object of this invention to provide a single conversion communication system which effectively attenuates local oscillator frequencies during transmission and yet utilizes bandpass RF filters which have approximately twice the bandpass range of prior single conversion communication systems.

It is also an object of this invention to provide a communication system which utilizes a selection of the local oscillator frequency to place the image frequency outside the bandpass of the RF section of the system.

It is also an object of this invention to provide a method for receiving and transmitting RF signals wherein the local oscillator frequency and image frequency are effectively attenuated by utilizing proper selection of the local oscillator frequency with respect to the bandpass characteristics of the RF section of the communication system.

An illustrated embodiment of the invention provides a communication system having a radio frequency (RF) section with a given bandpass characteristic, a local oscillator, and an intermediate frequency (IF) amplifier section. An improvement comprises circuitry to offset the local oscillator frequency to properly choose high side mixing or low side mixing for producing the greatest attenuation of the local oscillator and image frequencies.

Also provided is a method for processing a desired RF signal having a frequency within a band of frequencies which comprises selecting a local oscillator frequency which converts the desired RF signal from, or to, the IF frequency and which also maximally attenuates the local oscillator and image frequencies.

DESCRIPTION OF THE PREFERRED EMBODIMENT

Figure 1:
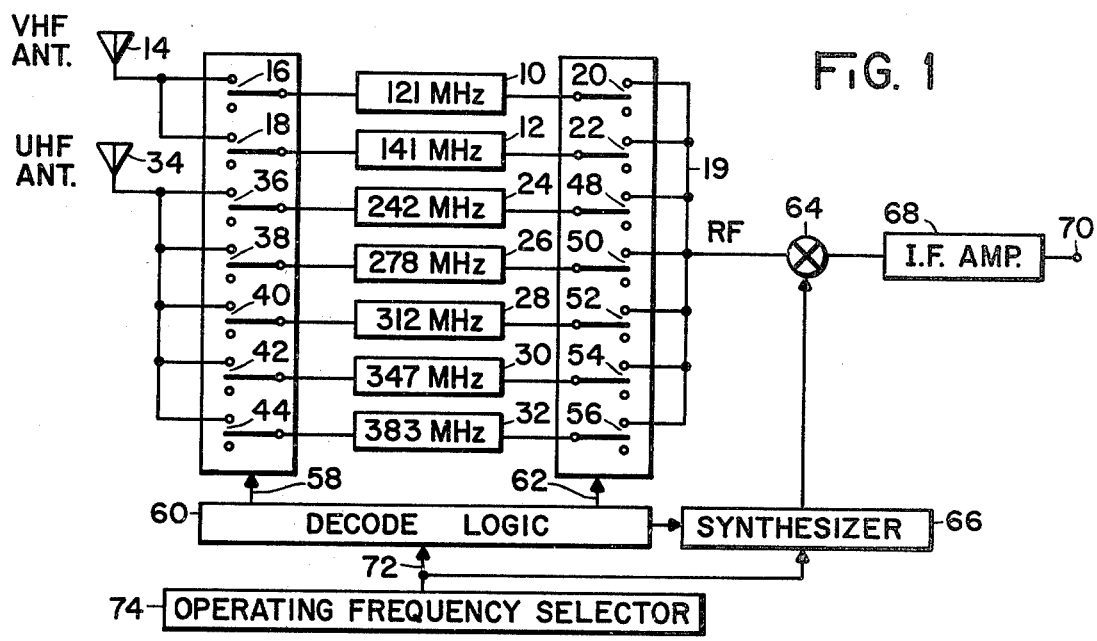
FIG. 1 is a block diagram of the RF and IF section of a communication system.

Now referring to FIG. 1, seven bandpass filters and two pin diode switching arrays comprise the RF section of the communication system shown. The first two bandpass filters are a filter 10 having a center frequency of 121 megahertz, and a filter 12 having a center frequency of 141 megahertz. One end of these filters is connectable to a VHF antenna 14 via two pin diode switches 16, for filter 10, and 18, for filter 12. The other end of these two filters is connected to pin diode switches 20 and 22 switchable to a common bus line 19 wherein filter 10 is switched via pin diode switch 20 and filter 12 is switched via pin diode switch 22. The remaining five bandpass filters are shown as blocks 24, 26, 28, 30 and 32 having center frequencies of 242, 278, 312, 347, and 383 megahertz respectively. One end of each of these five filters is connectable to a UHF antenna 34 via pin diode switches 36, 38, 40, 42 and 44 respectively, and the other end of the bandpass filters is connectable to bus line 19 by pin diode switches 48, 50, 52, 54 and 56 connected to each of the filters 24, 26, 28, 30 and 32 respectively. The diode switch array connected to the two antennas is controlled by interconnect line 58 which in turn is driven by the decode logic of block 60. The second set of diode switches is controlled by interconnect line 62 which also comes from the decode logic of block 60. The bus output from the second set of pin diode switches appearing on line 19 is connected to a mixing circuit 64 which in turn has an input from a synthesizer 66 which operates as a local oscillator (LO). The synthesizer has one input from the decode logic of block 60. Mixer 64 is connected to an IF amplifier 68 which has either an input or an output at line 70 depending on the function of the tuning system. The input to the decoding logic and the other control input to synthesizer 66 appears at a line 72 which is also connected to an operating frequency selector 74. Operating frequency selector 74 can be a thumbwheel switch for manual entry of a desired RF frequency, or logic for encoding the frequency information from other logic circuitry (not shown).

In operation, if the tuning system is being used as a receiver, the desired receiver frequency is coded onto line 72 by the selector 74 and thereby transferred to decode logic 60. The decode logic performs two functions. First the logic selects the proper bandpass filter and consequently selects the proper antenna for receiving the RF signal. The proper antenna and bandpass filter is selected by closing only one of the pin diode switches 16, 18, 36, 38, 40, 42, or 44 of the first pin diode switch array via control line 58, and also by closing only the corresponding pin diode switch of the second diode array controlled by control line 62. In this manner the proper bandpass filter and antenna are selected to provide the proper band of frequencies onto the bus line 19. The second function of the decode logic 60 is to determine if the receiver should high side mix or low side mix. The results of this determination are transferred to synthesizer 66. The decode logic 60 selects either low side or high side mixing by first determining if the desired RF signal is in the upper half of the passband of the selected bandpass filter or in the lower half of the passband of the selected filter. In its simplest form, the decode logic 60 could thus be a read only memory in which each frequency in the band in 1 mHz increments would address a separate data word which in turn would indicate the proper filter and mixing mode. If the desired signal frequency is in the upper half of the bandpass filter, then the IF frequency of the IF amplifier 68, which in this embodiment is 29 megahertz, is added to or offsets positively the selected RF frequency in synthesizer 66 to obtain the proper local oscillator frequency. This produces high side mixing since the local oscillator frequency is greater than the RF signal frequency. If the desired RF frequency is below the midband of the bandpass filter selected, then the IF frequency is subtracted or offset negatively from the selected RF signal frequency in synthesizer 66 to arrive at the proper local oscillator frequency. This results in low side mixing since the local oscillator frequency is less than the RF frequency. The local oscillator signal from synthesizer 66 is combined in mixer 64 with the RF signal, and the resulting output of the mixer is fed into IF amplifier 68 for amplification and filtering. The output of IF amplifier 68 then appears at line 70 for subsequent use by the communication system.

In the case of a transmitter, the same procedure is followed by decode logic 60 to select either high side or low side mixing and the bandpass filters. The main difference is that the signal flow is reversed, coming into IF amplifier 68 at line 70, amplified and mixed with the LO signal in mixer 64, fed onto bus 19, through the bandpass filters, and out through either VHF antenna 14 or UHF antenna 34. To further clarify the operation of the system of FIG. 1, two examples are given below. Assume that the desired RF signal is 229 megahertz, as will be shown later, this frequency falls into the bandpass of the third bandpass filter shown as block 24 of FIG. 1. Thus the decode logic 60 would select pin diode switch 36 thus connecting one end of bandpass filter 24 to UHF antenna 34, and also select pin diode 48 to complete the connection of filter 24 from the UHF antenna to the RF bus 19. Next the decode logic 60 would indicate to synthesizer 66 that 229 megahertz is below the center frequency, 242 megahertz, of the bandpass filter 24. The synthesizer would shift or offset the desired RF frequency, 229 megahertz, by the IF frequency, 29 megahertz, to arrive at a local oscillator frequency of 200 megahertz and thereby utilize low side mixing. The LO signals are combined in mixer 64 with the IF signals to produce the RF signals. The net result of mixing the RF frequency with the lower LO frequency, or low side mixing, is to place the local oscillator frequency and image frequency outside the bandpass characteristics of bandpass filter 24.

As a second example, consider a desired RF signal of 259 megahertz. As will be shown below, 259 megahertz is also within the passband of bandpass filter 24; therefore the same pin diode switches are selected by the decode logic 60 as in the previous example. Since the desired RF frequency is above the bandpass center frequency, the local oscillator frequency will be determined by shifting or offsetting the desired RF frequency, 259 megahertz, by the IF frequency, 29 megahertz, to produce a local oscillator frequency of 288 megahertz and thereby utilize high side mixing. The local oscillator frequency and image frequency is again outside the bandpass of filter 24.

The structure and operation of synthesizer 66 is basic since synthesizers having frequency offset capabilities are well known by those skilled in the art. The decode logic of block 60 can be implemented by at least three different methods. First the selection of filters and high side/low side mixing can be accomplished by standard logic techniques well known in the art. Second, a read only memory may be used as described above. Finally a microprocessor can be programmed to select the proper filter and mixing mode by common programming techniques. Each of these techniques have advantages and disadvantages as compared to the others, and the method selected would depend on the particular application. The method of the preferred embodiment is to use a microprocessor to permit easy adaptation to possible vendor changes in bandpass filter characteristics.

Figure 2:
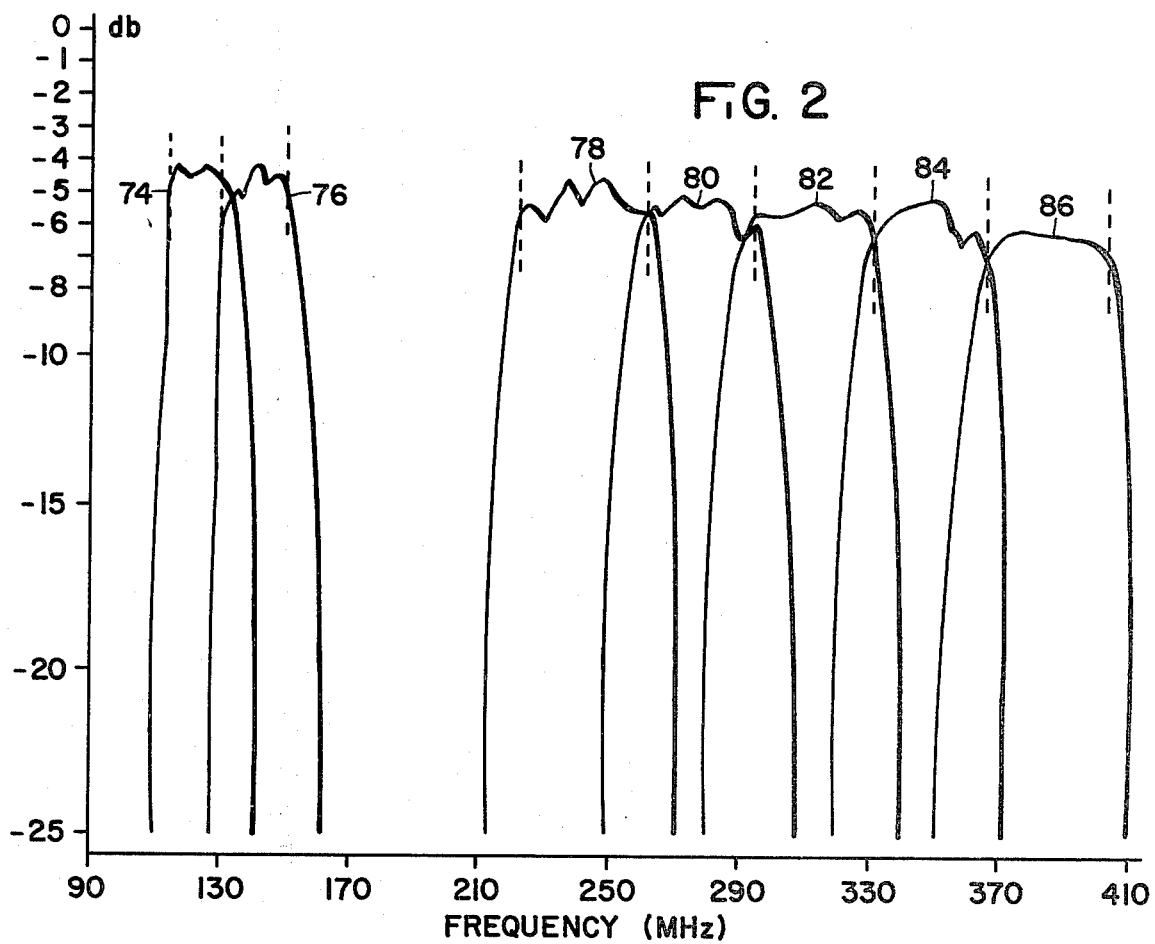
FIG. 2 is a graphical presentation of the bandpass characteristics of the RF bandpass filters shown in FIG. 1.

The bandpass characteristics of each of the bandpass filters of FIG. 1 are shown in FIG. 2. The bandpass filter characteristics are divided into two groups, a lower frequency or VHF group comprised of the filter characteristics of filters 10 and 12 of FIG. 1, and a higher frequency or UHF group comprised of the filter characteristics of filters 24, 26, 28, 30 and 32 of FIG. 1. Specifically filter 10 of FIG. 1 has characteristics depicted by curve 74 of FIG. 2, filter 12 of FIG. 1 has characteristics depicted by curve 76 of FIG. 2. Similarly, the characteristics of filter 24 of FIG. 1 are depicted by curve 78 of FIG. 2, and filters 26, 28, 30 and 32 of FIG. 1 are represented by curves 80, 82, 84 and 86 of FIG. 2 respectively. The vertical dotted lines bracketing each curve of FIG. 2 indicates a portion of the operating frequencies selected by the decode logic circuitry of block 60 of FIG. 1 for each of the respective bandpass filters. Thus input RF signals falling between the range of 116 to 132 megahertz would be passed through bandpass filter 10, and RF signals having a frequency in the range of 132 to 150 megahertz would be passed through bandpass filter 12. In connection with the illustrations given above decode logic 60 would select filter 24 for RF signals having frequencies in the range of 226 to 260 megahertz. Thus the input RF frequencies of 229 megahertz and 259 megahertz would fall into the region for which the decode logic 60 would select filter 24. Although the embodiment shown may be used for both receiving and transmitting, these bandpass filters of FIG. 2 have bandwidths which are narrow enough to suppress image frequencies during receiver operation of the system. Although the filters are only two IF wide in the passband, they are four IF wide at −70 dB, which is the specified rejection of image frequency signals. However during transmission of RF signals, it is important to not only suppress the image frequency, but also to suppress local oscillator signals which are passed through mixer 64 of FIG. 1 and through the bandpass filters onto the antenna along with the desired RF signal. Thus a 70 dB suppression of the local oscillator signal would require narrower filters or filters with steeper sides than those shown in FIG. 2. Note that without proper selection of the high side mixing and low side mixing, it would be possible to receive a strong image frequency signal through the antenna under certain conditions. That is a desired RF frequency at an edge of the bandpass filters would allow a strong image frequency signal to pass to the mixer if either high side mixing or low side mixing alone were utilized. Thus in the example above, if low side mixing alone were used, a strong 201 megahertz image frequency signal would be received along with the desired 259 megahertz signal since both would be within the passband of the bandpass filter (24) selected. However by judicious selection of high side mixing and low side mixing, it is possible to place the image frequency signal far outside the bandpass of the filter selected. Conversely the ability to select either low side mixing or high side mixing allows the use of RF bandpass filters which are relatively broad.

Thus it has been shown that the embodiment illustrated in FIG. 1 provides a single conversion transmitter/receiver in which the local oscillator frequency lies outside the pass band of the RF section of the receiver and yet allows wider bandwidth bandpass filters than previously possible under prior art designs. The embodiment also makes it possible to design communications system with a plurality of filters having bandwidths approaching twice the IF frequency of the first IF stage. Also a method has been described for utilizing single conversion in communication systems for rejecting image frequencies during reception and transmission of RF signals and also for rejecting LO frequencies during transmission by placing the LO frequency and the image frequency outside the bandpass of the RF filter of the system by judicious selection of either high side or low side mixing.

While the invention has been particularly shown and described with reference to the preferred embodiment shown, it will be understood by those skilled in the art that various changes may be made therein without departing from the teachings of the invention. Therefore, it is intended in the appended claims to cover all such equivalent variations as come within the scope and spirit of the invention.

What is claimed is:

1. A tuning system for handling RF signals having substantially any frequency contained in a band of frequencies, said system comprising:
   (a) a plurality of switchable bandpass filters;
   (b) logic means coupled to said filters for determining which of said bandpass filters the frequency of an RF signal is contained therein, and for determining if said RF signal frequency is above or below a center frequency of said selected bandpass filter; and
   (c) tuning means coupled to said filters and responsive to said logic means for generating a local oscillator frequency to high side mix RF signal frequencies above said center frequency of said selected bandpass filter, and to low side mix RF signal frequencies below said center frequency of said selected bandpass filter.

2. A transmitter radio frequency (RF) section for transmitting a RF signal having a frequency within a band of frequencies comprising:
   (a) a plurality of bandpass filters each having a predetermined bandpass range of frequencies;
   (b) logic means for selecting one of said plurality of bandpass filters for passing an RF signal within the bandpass of said bandpass filter; and
   (c) a local oscillator having a frequency determined by said logic means such that said frequency of said local oscillator is placed outside of said predetermined bandpass range of said selected bandpass filter.

3. A transmitter radio frequency (RF) section for transmitting a RF signal having a frequency within a band of frequencies comprising:
   (a) a plurality of bandpass filters each having a predetermined bandpass range of frequencies;
   (b) logic means for selecting one of said plurality of bandpass filters for passing an RF signal within the bandpass of said bandpass filter; and
   (c) a local oscillator having a frequency determined by said logic means such that said frequency of said local oscillator and an image frequency is placed outside of said predetermined bandpass range of said selected bandpass filter.

4. A receiver radio frequency (RF) section for receiving a RF signal having a frequency within a band of RF frequencies comprising:
   (a) a plurality of bandpass filters each having a predetermined bandpass range of frequencies;
   (b) logic means for selecting one of said plurality of bandpass filters for passing an RF signal within the bandpass of said bandpass filter; and
   (c) a local oscillator having a frequency determined by said logic means such that an image frequency of the RF signal is placed outside of said predetermined bandpass range of said selected bandpass filter.

5. A single conversion transmitter for mixing a local oscillator frequency with an intermediate frequency (IF) for producing a radio frequency (RF) signal having a frequency within a range of frequencies comprising:
   (a) a plurality of selectable bandpass filters each having a predetermined bandpass frequency range;

(b) logic means coupled to said bandpass filters for selecting one of said bandpass filters wherein the RF signal frequency is within said predetermined bandpass frequency range of said selected bandpass filter; and (c) local oscillator means coupled to said logic means for generating a mixing signal having a frequency selected to be one of a frequency greater and less than the RF signal by a difference equal to the IF of the receiver, wherein said frequency of said local oscillator is greater than the frequency of the RF signal for frequencies of the RF signal greater than a predetermined frequency in said predetermined passband frequency range of said selected bandpass filter, and said frequency of said local oscillator is less than the frequency of the RF signal for frequencies of the RF signal less than said predetermined frequency in said predetermined passband frequency of said selected bandpass filter.

6. A method of converting a desired radio frequency (RF) signal having a frequency within a band of RF frequencies to an intermediate frequency (IF) which comprises the steps of:

(a) passing the RF signal through one of a plurality of bandpass filters, said bandpass filter selected having a bandpass which encompases the frequency of the desired RF signals;

(b) determining if the frequency of the RF signal is above or below a predetermined frequency of said bandpass of said selected filter; and (c) mixing the desired RF signal with a local oscillator signal, said local oscillator signal having a frequency which is greater than the frequency of the desired RF signal by an amount equal to the IF for frequencies of the desired RF signal above said predetermined frequency, and said local oscillator signal having a frequency which is less than the frequency of the desired RF signal by an amount equal to the IF for frequencies of the desired RF signal below said predetermined frequency.

* * * * *